United States Patent
Shimada et al.

(10) Patent No.: US 9,931,933 B2
(45) Date of Patent: Apr. 3, 2018

(54) INPUT DEVICE AND STEERING INPUT DEVICE

(71) Applicant: Panasonic Intellectual Property Management Co., Ltd., Osaka (JP)

(72) Inventors: Ryo Shimada, Fukui (JP); Hideaki Eto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 160 days.

(21) Appl. No.: 15/200,090

(22) Filed: Jul. 1, 2016

(65) Prior Publication Data
US 2017/0024063 A1    Jan. 26, 2017

(30) Foreign Application Priority Data
Jul. 22, 2015    (JP) .................................. 2015-145266

(51) Int. Cl.
| | | |
|---|---|---|
| *B60K 35/00* | (2006.01) | |
| *G06F 3/0362* | (2013.01) | |
| *G06F 3/02* | (2006.01) | |
| *G06F 3/0354* | (2013.01) | |

(52) U.S. Cl.
CPC ................ *B60K 35/00* (2013.01); *G06F 3/02* (2013.01); *G06F 3/03547* (2013.01); *B60K 2350/104* (2013.01); *B60K 2350/1024* (2013.01); *B60K 2350/928* (2013.01); *G06F 3/0362* (2013.01)

(58) Field of Classification Search
CPC ........ G06F 3/02; G06F 3/0202; G06F 3/0205; G06F 3/0208; G06F 3/033; G06F 3/03547; G06F 3/0362; G06F 3/038; B60K 35/00; B60K 2350/1024; B60K 2350/928; B60K 2350/1028; B60K 2350/104; B60K 2350/1048; B60K 2350/1032; B60K 2350/10; B60K 2350/1008
See application file for complete search history.

(56) References Cited

U.S. PATENT DOCUMENTS

| | | | | |
|---|---|---|---|---|
| 5,313,027 A | * | 5/1994 | Inoue ..................... | H01H 13/64 200/1 B |
| 6,373,265 B1 | * | 4/2002 | Morimoto ............ | G01D 5/2417 324/661 |
| 6,958,614 B2 | * | 10/2005 | Morimoto ............... | G01L 1/142 324/661 |

(Continued)

FOREIGN PATENT DOCUMENTS

JP    2015-033974    2/2015

*Primary Examiner* — Julie Anne Watko
(74) *Attorney, Agent, or Firm* — Greenblum & Bernstein, P.L.C.

(57) ABSTRACT

The input device includes a press switch configured to be pressed in a direction of a predetermined axis, a first operation member configured to be moved along the predetermined axis to press the press switch, a second operation member disposed circularly around the first operation member and configured to be tilted relative to the predetermined axis to press the press switch, a first touch sensor disposed on the first operation member and configured to detect contact of a finger of a right hand with the first operation member, and a second touch sensor disposed on the second operation member and configured to detect contact of the finger of the right hand with the second operation member.

7 Claims, 10 Drawing Sheets

(56) References Cited

U.S. PATENT DOCUMENTS

| | | | |
|---|---|---|---|
| 2004/0200699 A1* | 10/2004 | Matsumoto | H01H 13/702 200/1 B |
| 2007/0080952 A1* | 4/2007 | Lynch | G06F 3/0202 345/173 |
| 2007/0159459 A1* | 7/2007 | Wang | G06F 3/03547 345/156 |
| 2008/0088582 A1* | 4/2008 | Prest | G06F 3/0338 345/156 |
| 2008/0088600 A1* | 4/2008 | Prest | G06F 3/03547 345/173 |
| 2008/0202824 A1* | 8/2008 | Philipp | G06F 3/02 178/18.01 |
| 2015/0041299 A1 | 2/2015 | Suzuki et al. | |

* cited by examiner

INPUT DEVICE AND STEERING INPUT DEVICE

BACKGROUND

1. Technical Field

The present disclosure relates to an input device and a steering input device including the same.

2. Description of the Related Art

A known input device is used to operate, for example, an audio instrument mounted on a vehicle (for example, refer to PTL 1). This input device is disposed on a steering wheel of the vehicle so that a driver can operate the input device while driving the vehicle.

The input device includes a housing, an operation member supported tiltably in a plurality of directions by the housing, and a plurality of press switches (for example, mechanical switches such as tactile switches) respectively disposed for tilt directions of the operation member. When the driver tilts the operation member in any one of the directions, the operation member presses one of the press switches that corresponds to the tilt direction of the operation member. Accordingly, an operation associated with the press switch thus pressed is executed.

CITATION LIST

Patent Literature

PTL 1: Unexamined Japanese Patent Publication No. 2015-33974

However, in the input device disclosed in PTL 1, a large number of press switches are mounted, which results in variation in aging of the press switches and in variation in a risk of failure of the input device.

SUMMARY

To solve this problem, the present disclosure provides an input device and a steering input device that can achieve reduced variation in generation of failure.

An input device according to an aspect of the present disclosure includes a press switch, a first operation member, a second operation member, a first touch sensor, and a second touch sensor. The press switch is configured to be pressed in a direction of a predetermined axis. The first operation member is configured to be moved in the predetermined axis to press the press switch. The second operation member is disposed circularly around the first operation member and configured to be tilted relative to the predetermined axis to press the press switch. The first touch sensor is disposed on the first operation member and configured to detect contact of an operating object with the first operation member. The second touch sensor is disposed on the second operation member and configured to detect contact of the operating object with the second operation member.

These comprehensive or specific aspects may be achieved by a system, a method, an integrated circuit, a computer program, or a computer-readable recording medium such as a CD-ROM, or may be achieved by an optional combination of the system, the method, the integrated circuit, the computer program, and the recording medium.

An input device according to the present disclosure can achieve reduced variation in generation of failure.

DETAILED DESCRIPTION

Figure 1:
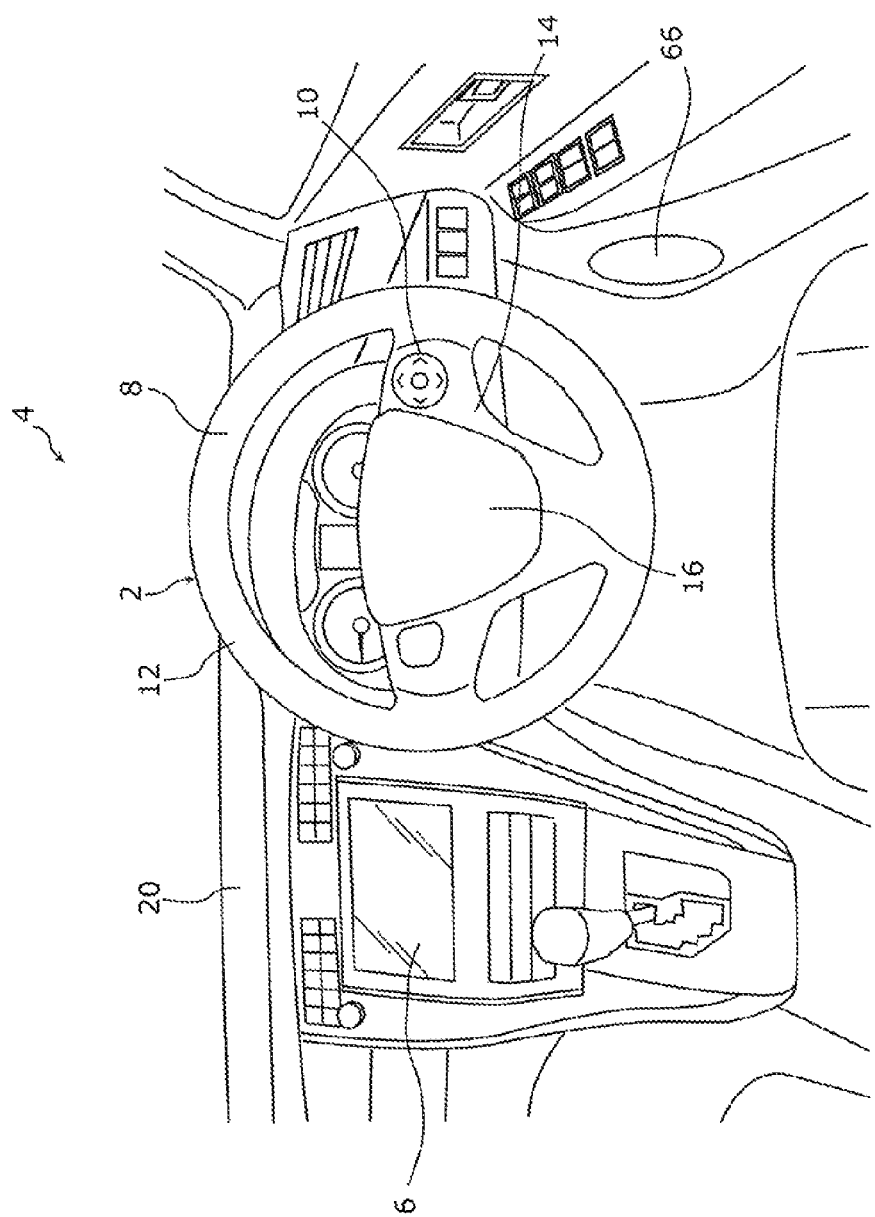
FIG. 1 illustrates a steering input device according to a first exemplary embodiment.

Underlying Knowledge Forming Basis of the Present Disclosure

The inventor of the present disclosure has found that the technique described in "Description of the Related Art" has the following problem.

The input device disclosed in PTL 1 includes the housing, the first operation member, the second operation member, and the five press switches (for example, mechanical switches such as tactile switches). The first operation member is supported by the housing in such a manner as to allow the first operation member to be pressed down. The second operation member is disposed circularly around the first operation member and is supported tiltably in four directions of up, down, right, and left directions by the housing. One press switch is disposed on a back surface of the first operation member. Four press switches corresponding to the four directions are disposed on a back surface of the second operation member.

When a user presses down the first operation member, the press switch corresponding to the first operation member is pressed by the first operation member. Accordingly, an operation associated with the press switch thus pressed is executed.

When the user tilts the second operation member in one of the four directions, one of the four press switches that corresponds to this tilt direction of the second operation member is pressed by the second operation member. Accordingly, an operation associated with this press switch thus pressed is executed.

However, such a configuration requires five press switches to be disposed, which results in variation in aging of the press switches and in variation in a risk of failure of the input device.

To solve this problem, an input device according to an aspect of the present disclosure includes a press switch, a first operation member, a second operation member, a first touch sensor, and a second touch sensor. The press switch is configured to be pressed in a direction of a predetermined axis. The first operation member is configured to be moved in the predetermined axis to press the press switch. The second operation member is disposed circularly around the first operation member and configured to be tilted relative to the predetermined axis to press the press switch. The first touch sensor is disposed on the first operation member and configured to detect contact of an operating object with the first operation member. The second touch sensor is disposed on the second operation member and configured to detect contact of the operating object with the second operation member.

According to the present aspect, the first touch sensor is disposed on the first operation member, and the second touch sensor is disposed on the second operation member. When the operating object presses down the first operation member, the first touch sensor detects contact of the operating object and the press switch is pressed by the first operation member. Accordingly, execution of an operation associated with the first operation member can be instructed. When the operating object tilts the second operation member, the second touch sensor detects contact of the operating object and the press switch is pressed by the second operation member. Accordingly, execution of an operation associated with the second operation member can be instructed. In this manner, when the press switch is pressed, it is possible to detect which of the first operation member and the second operation member the operating object contacts. With this configuration, it is possible to determine, by one press switch, which of a plurality of operations (operations associated with the first operation member and the second operation member) is instructed to be executed. As a result, the number of press switches can be reduced, thereby achieving reduced variation in generation of failure of the input device.

For example, the input device may further include a controller configured to determine that execution of a predetermined operation is instructed by a user when the press switch is pressed. The controller may be configured as described below. The controller determines that execution of a first operation associated with the first operation member is instructed when the press switch is pressed and the first touch sensor detects contact of the operating object. The controller also determines that execution of a second operation associated with the second operation member is instructed when the press switch is pressed and the second touch sensor detects contact of the operating object.

According to the present aspect, the controller can determine that execution of one of the first operation and the second operation is instructed, based on detection signals from the first touch sensor and the second touch sensor.

For example, when the press switch is pressed and the first touch sensor and the second touch sensor both detect contact of the operating object, the controller may determine that execution of one of the first operation and the second operation is instructed, based on a comparison of strengths of detection signals from the first touch sensor and the second touch sensor with a threshold.

According to the present aspect, when the operating object simultaneously contact the first operation member and the second operation member, the controller makes a determination as described below. The controller can accurately determine which of the first operation and the second operation is instructed to be executed by comparing the strengths of detection signals from the first touch sensor and the second touch sensor with the threshold.

For example, the input device may be configured such that the second operation member is tiltable relative to a predetermined axis in a plurality of directions and includes a plurality of operation regions disposed for the respective directions, and the second touch sensor detects contact of the operating object with any of the operation regions. The controller may determine that execution of the second operation associated with the operation region is instructed, when the press switch is pressed and the second touch sensor detects the contact of the operating object.

According to the present aspect, the second touch sensor detects contact of the operating object with any of the plurality of operation regions of the second operation member. With this configuration, it is possible to determine, by one press switch, which of a plurality of operations (operations associated with the respective operation regions) is instructed to be executed.

For example, the first operation member may include a first pressing part configured to press the press switch, and a first contact part disposed on the first pressing part at an end opposite to the press switch, the first contact part to which the operating object contacts. The first touch sensor may be disposed between the first pressing part and the first contact part.

According to the present aspect, the first touch sensor is disposed between the first pressing part and the first contact part. With this configuration, when the operating object contacts the first contact part, the first touch sensor can detect the contact of the operating object.

For example, the second operation member may include a second pressing part configured to press the press switch, and a second contact part disposed on the second pressing part at an end opposite to the press switch, the second contact part to which the operating object contacts. The second touch sensor may be disposed between the second pressing part and the second contact part.

According to the present aspect, the second touch sensor is disposed between the second pressing part and the second contact part. With this configuration, when the operating object contacts the second contact part, the second touch sensor can detect the contact of the operating object.

A steering input device according to an aspect of the present disclosure includes a steering wheel, and the above-described input device disposed on the steering wheel.

According to the present aspect, the input device is disposed on the steering wheel of a vehicle, which allows a driver to easily perform inputting on the input device while driving the vehicle.

These comprehensive or specific aspects may be achieved by a system, a method, an integrated circuit, a computer program, or a computer-readable recording medium such as a CD-ROM, or may be achieved by an optional combination of the system, the method, the integrated circuit, the computer program, and the recording medium.

Exemplary embodiments of the present disclosure will be described in detail below with reference to the accompanying drawings.

The exemplary embodiments described below are comprehensive or specific examples. Numerical values, shapes, materials, components, arrangement and connection of the components, steps, and orders of the steps disclosed in the embodiments below are merely examples, and are not intended to limit the present disclosure. Among components in the embodiments below, any component not recited in an independent claim disclosing a topmost concept is described as an optional component.

FIRST EXEMPLARY EMBODIMENT

1-1. Configuration of Steering Input Device

Figure 2:
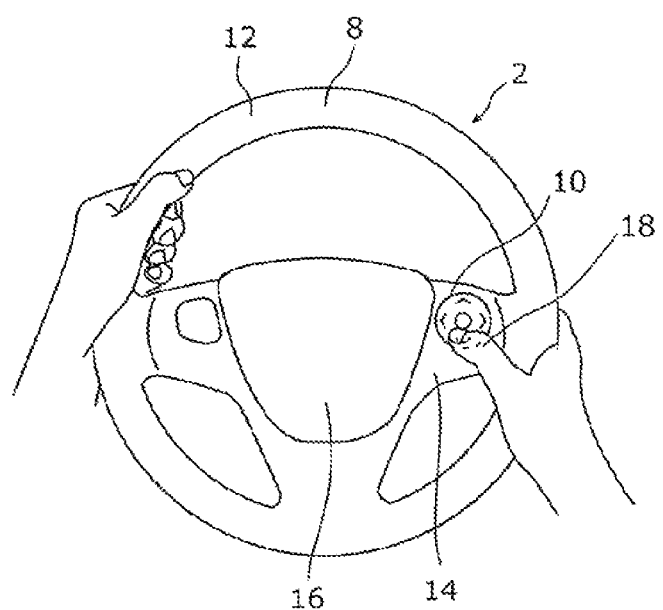
FIG. 2 illustrates a usage example of the steering input device according to the first exemplary embodiment.

Firstly, the configuration of steering input device 2 according to a first exemplary embodiment will be described with reference to FIGS. 1 and 2. FIG. 1 illustrates steering input device 2 according to the first exemplary embodiment. FIG. 2 illustrates a usage example of steering input device 2 according to the first exemplary embodiment.

Steering input device 2 and in-vehicle instrument 6 are mounted in a vehicle interior of automobile 4 (an exemplary vehicle) illustrated in FIG. 1. Steering input device 2 according to the first exemplary embodiment includes steering wheel 8 and input device 10.

Steering wheel 8 is used to steer automobile 4. Steering wheel 8 includes rim 12 having a ring shape, substantially T-shaped spoke 14 integrally formed on an inner periphery of rim 12, and horn switch cover 16 covering a horn switch (not illustrated) disposed on a central part of spoke 14.

Input device 10 is used to operate in-vehicle instrument 6 and is disposed on, for example, spoke 14 of steering wheel 8. As illustrated in FIG. 2, a driver as a user can operate in-vehicle instrument 6 by performing inputting on input device 10 with finger 18 (an exemplary operating object) of a right hand that holds rim 12. The configuration of input device 10 will be described later.

In-vehicle instrument 6 is, for example, an audio instrument used to play back an optical disk such as a compact disk. In-vehicle instrument 6 is disposed in, for example, dashboard 20. The configuration of in-vehicle instrument 6 will be described later.

1-2. Configuration of Input Device

Figure 3:
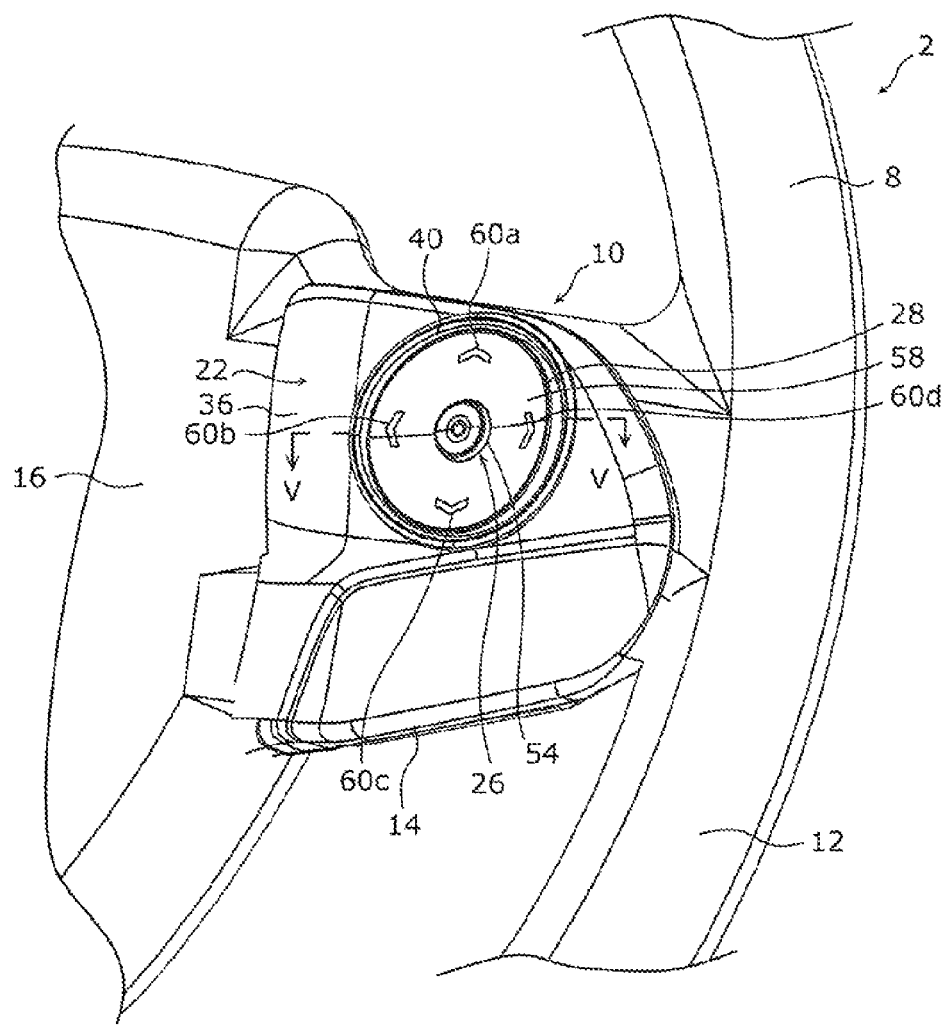
FIG. 3 is an enlarged view illustrating an input device according to the first exemplary embodiment.
Figure 4:
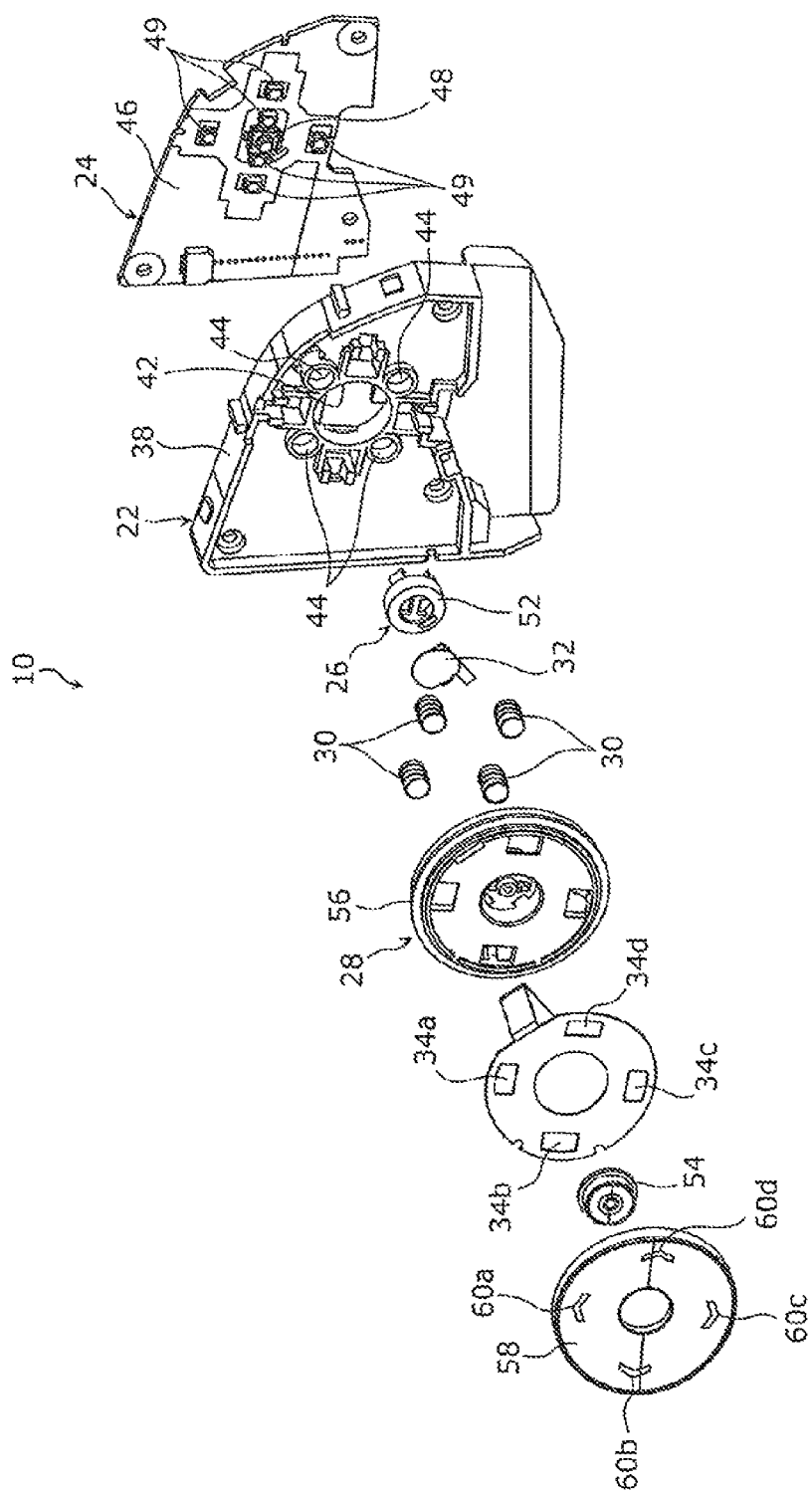
FIG. 4 is an exploded perspective view illustrating the input device according to the first exemplary embodiment.
Figure 5:
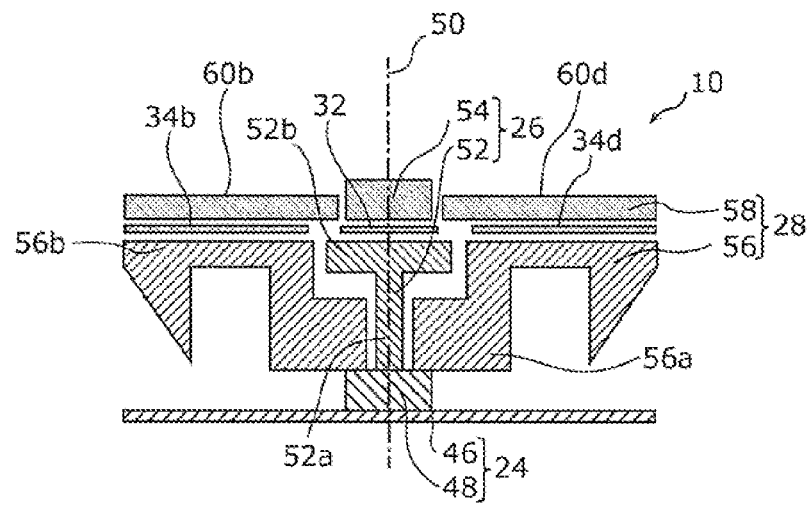
FIG. 5 is a schematic sectional view taken along line V-V in FIG. 3.
Figure 6:
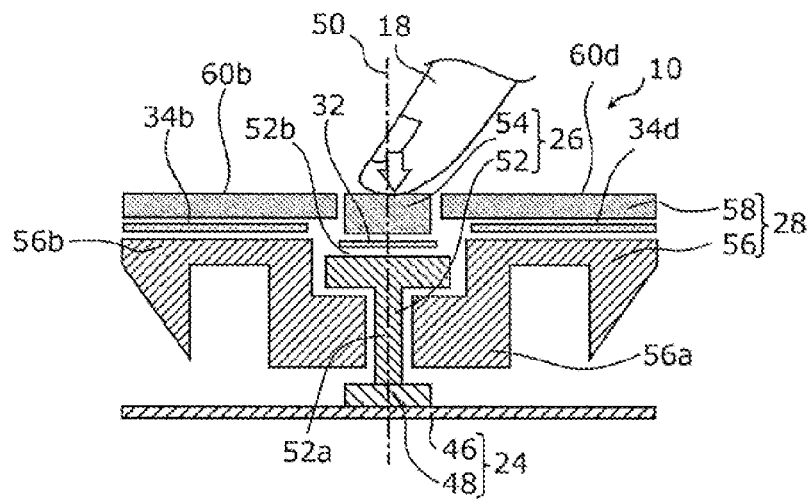
FIG. 6 is a schematic sectional view illustrating a state where a press switch is pressed by a first operation member.
Figure 7:
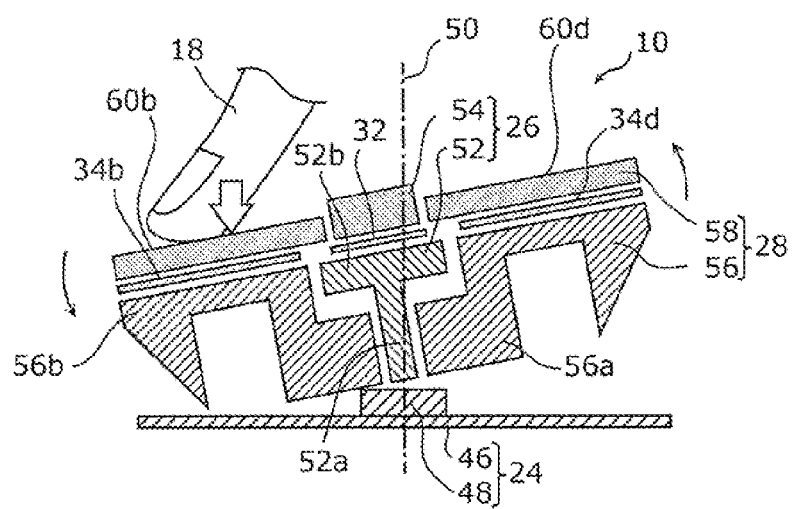
FIG. 7 is a schematic sectional view illustrating a state where the press switch is pressed by a second operation member.

Next, the configuration of input device 10 according to the first exemplary embodiment will be described with reference to FIGS. 3 to 7. FIG. 3 is an enlarged view illustrating input device 10 according to the first exemplary embodiment. FIG. 4 is an exploded perspective view illustrating input device 10 according to the first exemplary embodiment. FIG. 5 is a schematic sectional view taken along line V-V in FIG. 3. FIG. 6 is a schematic sectional view illustrating a state where press switch 48 is pressed by first operation member 26. FIG. 7 is a schematic sectional view illustrating a state where press switch 48 is pressed by second operation member 28. For convenience of description, FIG. 4 does not illustrate front case 36.

As illustrated in FIGS. 3 to 5, input device 10 according to the first exemplary embodiment includes housing 22, switch unit 24, first operation member 26, second operation member 28, a plurality of (for example, four) elastic members 30, first touch sensor 32, and a plurality of (for example, four) second touch sensors 34a to 34d (34a, 34b, 34c, and 34d).

As illustrated in FIG. 3, housing 22 is disposed on spoke 14 of steering wheel 8. As illustrated in FIGS. 3 and 4, housing 22 is an assembly of front case 36 and rear case 38. Front case 36 is disposed closer to the driver, and rear case 38 is disposed closer to steering wheel 8. Front case 36 is provided with circular opening 40 through which first contact part 54 (to be described later) of first operation member 26 and second contact part 58 (to be described later) of second operation member 28 are exposed outside housing 22. Rear case 38 is provided with circular opening 42 in which first pressing part 52 (to be described later) of first operation member 26 is movably disposed and second pressing part 56 (to be described later) of second operation member 28 is tiltably disposed. Rear case 38 is further provided with a plurality of recesses 44 in which respective elastic members 30 are disposed.

Switch unit 24 is disposed between rear case 38 and spoke 14 of steering wheel 8. As illustrated in FIGS. 4 and 5, switch unit 24 includes printed wiring board 46, and one press switch 48 and six light emitting diodes (LEDs) 49 mounted on printed wiring board 46. Press switch 48 is a mechanical switch configured to be pressed in a direction of predetermined axis 50, and is, for example, a tactile switch. In response to the press on press switch 48, an "ON" signal is output from press switch 48 to controller 62 (to be described later). LEDs 49 are light sources for lighting first contact part 54 and second contact part 58.

First operation member 26 is used to press press switch 48 by linearly moving along predetermined axis 50. As illustrated in FIGS. 4 and 5, first operation member 26 includes first pressing part 52 and first contact part 54. First pressing part 52 has a substantially pin shape and is disposed to be linearly movable along predetermined axis 50 through opening 42 formed on rear case 38. As illustrated in FIG. 5, first end 52a of first pressing part 52 is disposed opposite to press switch 48. First contact part 54 has a substantially circular plate shape and is disposed at second end 52b (in other words, at an end opposite to press switch 48) of first pressing part 52. First contact part 54 is exposed outside housing 22 through opening 40 formed on front case 36.

As illustrated in FIG. 6, to perform inputting on first operation member 26 of input device 10, finger 18 of right hand presses down first operation member 26 toward press switch 48 with finger 18 contacting first contact part 54. Accordingly, press switch 48 is pressed by first pressing part 52. This state is illustrated by the height of press switch 48 in FIG. 6 being lower than the height of press switch 48 in FIG. 5. Thereafter, when finger 18 of right hand is released from first contact part 54, first operation member 26 is returned to the original position (position illustrated in FIG. 5) by elastic restoring force of press switch 48.

Second operation member 28 is used to press press switch 48 by tilting relative to predetermined axis 50 in any of a plurality of directions (for example, four directions of up, down, right, and left directions). As illustrated in FIGS. 4 and 5, second operation member 28 is disposed circularly around first operation member 26, and includes second pressing part 56 and second contact part 58. Second pressing part 56 has a ring shape, is disposed tiltably relative to predetermined axis 50 in opening 42 formed on rear case 38, and is disposed to surround around first pressing part 52. First end 56a of second pressing part 56 is disposed opposite to press switch 48. Second contact part 58 has a ring shape and is disposed on second end 56b (in other words, at an end opposite to press switch 48) of second pressing part 56. Second contact part 58 is disposed to surround around first contact part 54 and exposed outside housing 22 through opening 40 formed on front case 36, together with first contact part 54. As illustrated in FIGS. 3 and 4, a plurality of (for example, four) operation regions 60a to 60d (60a, 60b, 60c, and 60d) are disposed on a surface of second contact part 58 for the respective directions in which second operation member 28 is tilted.

The plurality of elastic members 30 are used to urge second operation member 28 in a tilted posture (posture illustrated in FIG. 7) back to the original posture (posture illustrated in FIG. 5), and are coil springs, for example. The plurality of elastic members 30 are disposed on respective recesses 44 formed on rear case 38.

As illustrated in FIG. 7, when inputting is performed on second operation member 28 of input device 10, finger 18 of right hand tilts second operation member 28 in any of the plurality of directions with finger 18 contacting any of operation regions 60a to 60d. In the example illustrated in FIG. 7, finger 18 of right hand tilts second operation member 28 in the left direction (direction corresponding to operation region 60b) with finger 18 contacting operation region 60b. Accordingly, press switch 48 is pressed by second pressing part 56. At this time, first operation member 26 is tilted together with second operation member 28. This state is illustrated by the height of press switch 48 in FIG. 7 being lower than the height of press switch 48 in FIG. 5. Thereafter, when finger 18 of right hand is released from second contact part 58, second operation member 28 is returned to the original posture (posture illustrated in FIG. 5) by elastic restoring force of elastic member 30.

As illustrated in FIGS. 4 and 5, first touch sensor 32 is a sensor used to detect contact of finger 18 of right hand with first contact part 54 and is disposed between first pressing part 52 and first contact part 54. The detection of the contact of finger 18 of right hand by first touch sensor 32 causes first touch sensor 32 to output a detection signal to controller 62. First touch sensor 32 is, for example, a capacitance touch sensor.

As illustrated in FIGS. 4 and 5, the plurality of second touch sensors 34a to 34d are each disposed between second pressing part 56 and second contact part 58. Second touch sensors 34a to 34d are sensors used to detect contact of finger 18 of right hand with operation regions 60a to 60d, and are disposed for respective operation regions 60a to 60d. The detection of the contact of finger 18 of right hand by second touch sensors 34a to 34d causes second touch sensors 34a to 34d to output detection signals to controller 62. Second touch sensors 34a to 34d are, for example, capacitance touch sensors.

1-3. Functional Configuration of Input Device

Figure 8:
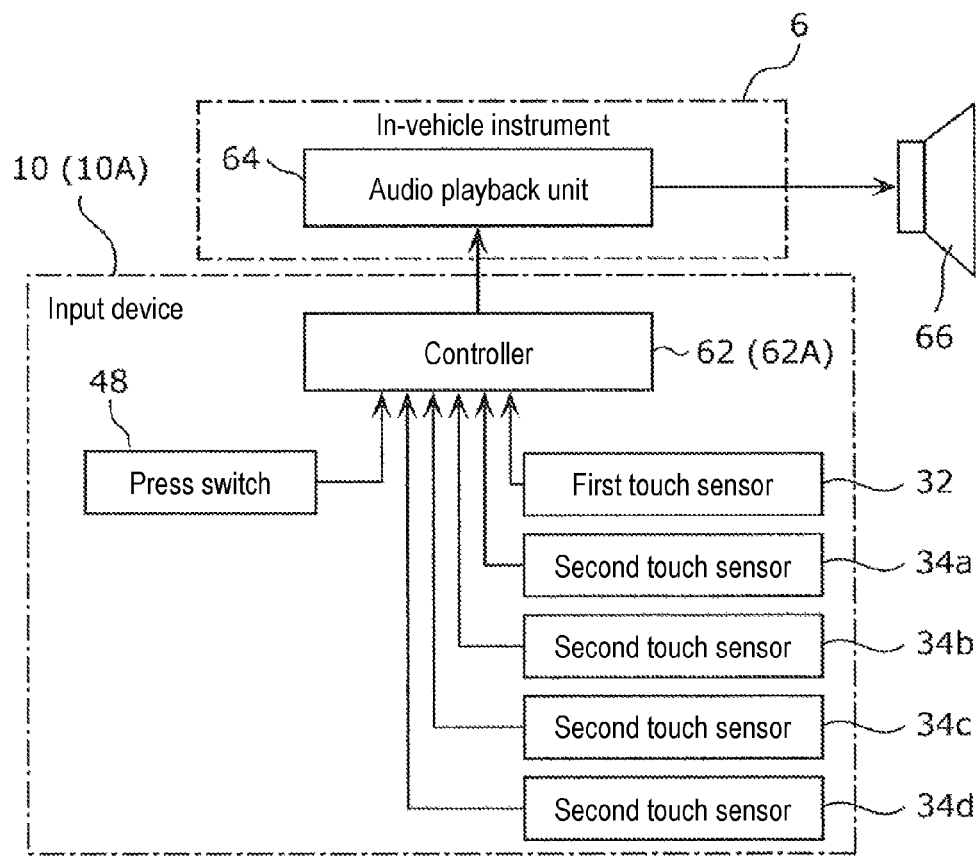
FIG. 8 is a block diagram illustrating a functional configuration of the input device according to the first exemplary embodiment (and a second exemplary embodiment)

Next, a functional configuration of input device 10 according to the first exemplary embodiment will be described with reference to FIG. 8. FIG. 8 is a block diagram of the functional configuration of input device 10 according to the first exemplary embodiment.

As illustrated in FIG. 8, input device 10 further includes controller 62. Controller 62 is, for example, a central processing unit (CPU) or a processor, and executes various functions by reading out a computer program stored in a memory (not illustrated) and executing the computer program. The following only describes a main function of controller 62.

Controller 62 determines that execution of a predetermined operation is instructed by the driver, based on the "ON" signal from press switch 48 and detection signals from first touch sensor 32 and second touch sensors 34a to 34d.

Specifically, when finger 18 of right hand presses down first operation member 26, press switch 48 is pressed and first touch sensor 32 detects contact of finger 18 of right hand. In this case, controller 62 determines that execution of a first operation associated with first operation member 26 is instructed, based on the "ON" signal from press switch 48 and the detection signal from first touch sensor 32. For example, controller 62 determines that execution of an operation to turn on or off the power of in-vehicle instrument 6 is instructed as the first operation associated with first operation member 26.

When finger 18 of right hand tilts second operation member 28 in any of the directions, press switch 48 is pressed and any one of second touch sensors 34a to 34d detects contact of finger 18 of right hand. In this case, controller 62 determines that execution of a second operation associated with any one of operation regions 60a to 60d is instructed, based on the "ON" signal from press switch 48 and the detection signal from any one of second touch sensors 34a to 34d.

For example, when finger 18 of right hand tilts second operation member 28 in a direction of operation region 60a, controller 62 determines that execution of an operation (the second operation associated with operation region 60a) to increase a sound volume of an audio signal played back by in-vehicle instrument 6 is instructed, based on the "ON" signal from press switch 48 and the detection signal from second touch sensor 34a. For example, when finger 18 of right hand tilts second operation member 28 in a direction of operation region 60c, controller 62 determines that execution of an operation (the second operation associated with operation region 60c) to decrease a sound volume of an audio signal played back by in-vehicle instrument 6 is instructed, based on the "ON" signal from press switch 48 and the detection signal from second touch sensor 34c.

For example, when finger 18 of right hand tilts second operation member 28 in a direction of operation region 60b, controller 62 determines that execution of an operation (the second operation associated with operation region 60b) to play back an audio signal by in-vehicle instrument 6 is instructed, based on the "ON" signal from press switch 48 and the detection signal from second touch sensor 34b. For example, when finger 18 of right hand tilts second operation member 28 in a direction of operation region 60d, controller 62 determines that execution of an operation (the second operation associated with operation region 60d) to stop playback of an audio signal by in-vehicle instrument 6 is instructed, based on the "ON" signal from press switch 48 and the detection signal from second touch sensor 34d.

A calibration may be performed in advance so that the strength of a detection signal from each of first touch sensor 32 and second touch sensors 34a to 34d does not exceed a predetermined value when finger 18 of right hand does not contact any of first contact part 54 and second contact part 58. Accordingly, false detection by first touch sensor 32 and second touch sensors 34a to 34d can be reduced.

As illustrated in FIG. 8, in-vehicle instrument 6 includes audio playback unit 64. Audio playback unit 64 selects an audio signal from among a plurality of audio signals recorded in, for example, an optical disk such as a compact disk in accordance with a control by controller 62, and plays back the selected audio signal. The playback of the audio signal by audio playback unit 64 causes speaker 66 (refer to FIG. 1) mounted in the vehicle interior of automobile 4 to output sound of the audio signal.

1-4. Operation of Input Device

Figure 9:
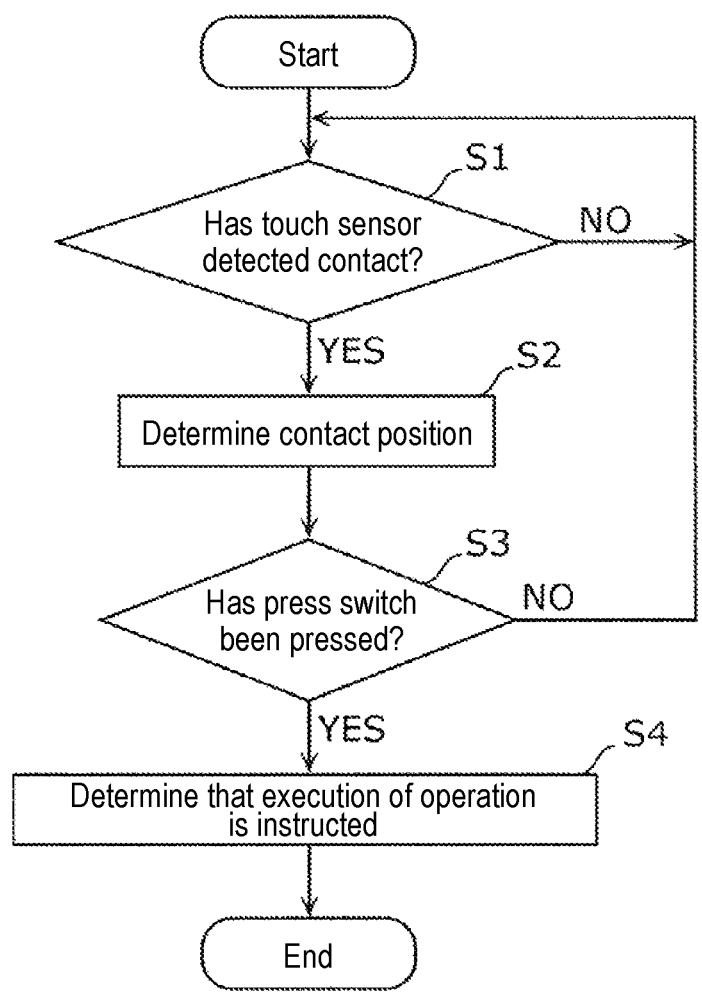
FIG. 9 is a flowchart illustrating a flow of an operation of the input device according to the first exemplary embodiment.

Next, an operation of input device 10 according to the first exemplary embodiment will be described with reference to FIGS. 6, 7, and 9. FIG. 9 is a flowchart illustrating the flow of the operation of input device 10 according to the first exemplary embodiment.

First, a case will be described in which the driver performs inputting on first operation member 26 of input device 10. As illustrated in FIG. 9, when finger 18 of right hand contacts first contact part 54, first touch sensor 32 detects the contact of finger 18 of right hand (YES in S1). Controller 62 determines that a contact position of finger 18 of right hand is at first contact part 54 based on a detection signal from first touch sensor 32 (S2).

Thereafter, as illustrated in FIG. 6, when finger 18 of right hand presses down first operation member 26, press switch 48 is pressed. Accordingly, controller 62 determines that execution of the first operation associated with first operation member 26 is instructed, based on an "ON" signal from press switch 48 and a detection signal from first touch sensor 32 (S4).

Next, a case will be described in which the driver performs inputting on second operation member 28 of input device 10. As illustrated in FIG. 9, for example, when finger 18 of right hand contacts operation region 60b of second contact part 58, second touch sensor 34b detects the contact of finger 18 of right hand (YES in S1). Controller 62 determines that a contact position of finger 18 of right hand is at operation region 60b of second contact part 58, based on a detection signal from second touch sensor 34b (S2).

Thereafter, as illustrated in FIG. 7, when finger 18 of right hand tilts second operation member 28 in a direction of operation region 60b, press switch 48 is pressed. Accordingly, controller 62 determines that execution of the second operation associated with operation region 60b is instructed, based on an "ON" signal from press switch 48 and a detection signal from second touch sensor 34b (S4).

1-5. Effects

Next, effects achieved by input device 10 according to the first exemplary embodiment will be described. As described above, first touch sensor 32 is disposed on first operation member 26, and the plurality of second touch sensors 34a to 34d are disposed on second operation member 28. When finger 18 of right hand presses down first operation member 26, first touch sensor 32 detects contact of finger 18 of right hand and press switch 48 is pressed by first operation member 26. Accordingly, execution of an operation associated with first operation member 26 can be instructed.

When finger 18 of right hand tilts second operation member 28 in any of the directions, any one of second touch sensors 34a to 34d detects contact of finger 18 of right hand, and press switch 48 is pressed by second operation member 28. Accordingly, execution of an operation associated with second operation member 28 can be instructed.

In this manner, the contact position of finger 18 of right hand can be detected when press switch 48 is pressed, and which of a plurality of operations is instructed to be executed can be determined by one press switch 48. As a result, the number of press switches 48 can be reduced, thereby achieving reduced variation in generation of failure of input device 10.

SECOND EXEMPLARY EMBODIMENT 2-1. Configuration of Input Device

Figure 10:
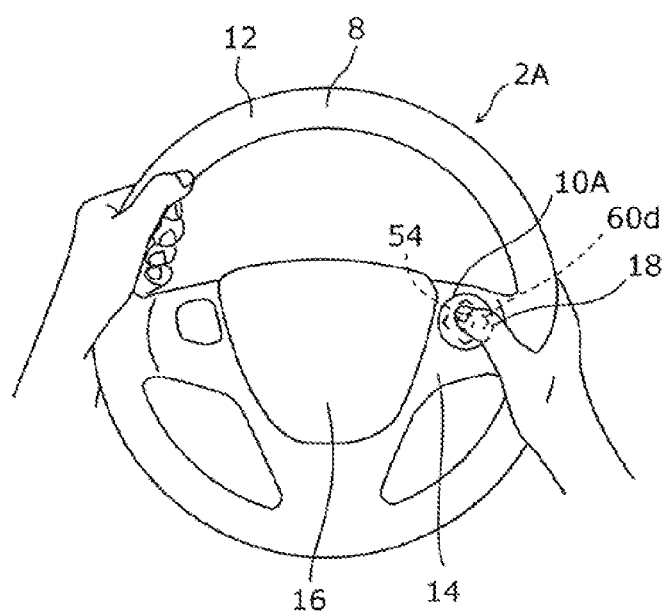
FIG. 10 illustrates an usage example of a steering input device according to a second exemplary embodiment.

Next, the configuration of input device 10A according to a second exemplary embodiment will be described with reference to FIGS. 8 and 10. FIG. 8 is a block diagram of a functional configuration of input device 10A according to the second exemplary embodiment. FIG. 10 illustrates a usage example of steering input device 2A according to the second exemplary embodiment. In the second exemplary embodiment, any component identical to the first exemplary embodiment is denoted by an identical reference numeral, and description thereof will be omitted.

As illustrated in FIG. 8, in input device 10A according to the second exemplary embodiment, when a detection signal from first touch sensor 32 and a detection signal from at least one of second touch sensors 34a to 34d have been simultaneously received, controller 62A determines that execution of one of the first operation and the second operation is instructed, based on a comparison of the strengths of the detection signals with a threshold.

Specifically, as illustrated in FIG. 10, for example, when the driver performs inputting on first operation member 26 of input device 10A, finger 18 of right hand may simultaneously contact first contact part 54 and operation region 60d of second contact part 58. In such a case, since finger 18 of right hand is trying to press down first operation member 26, a pressure received by first contact part 54 from finger 18 of right hand is larger than a pressure received by operation region 60d of second contact part 58 from finger 18 of right hand. Accordingly, the strength of the detection signal from first touch sensor 32 is larger than the threshold, and the strength of the detection signal from second touch sensor 34d is smaller than the threshold. Thus, controller 62A selects first touch sensor 32 of which the detection signal has a larger strength and determines that execution of the first operation is instructed, based on the detection signal from first touch sensor 32 thus selected.

2-2. Operation of Input Device

Figure 11:
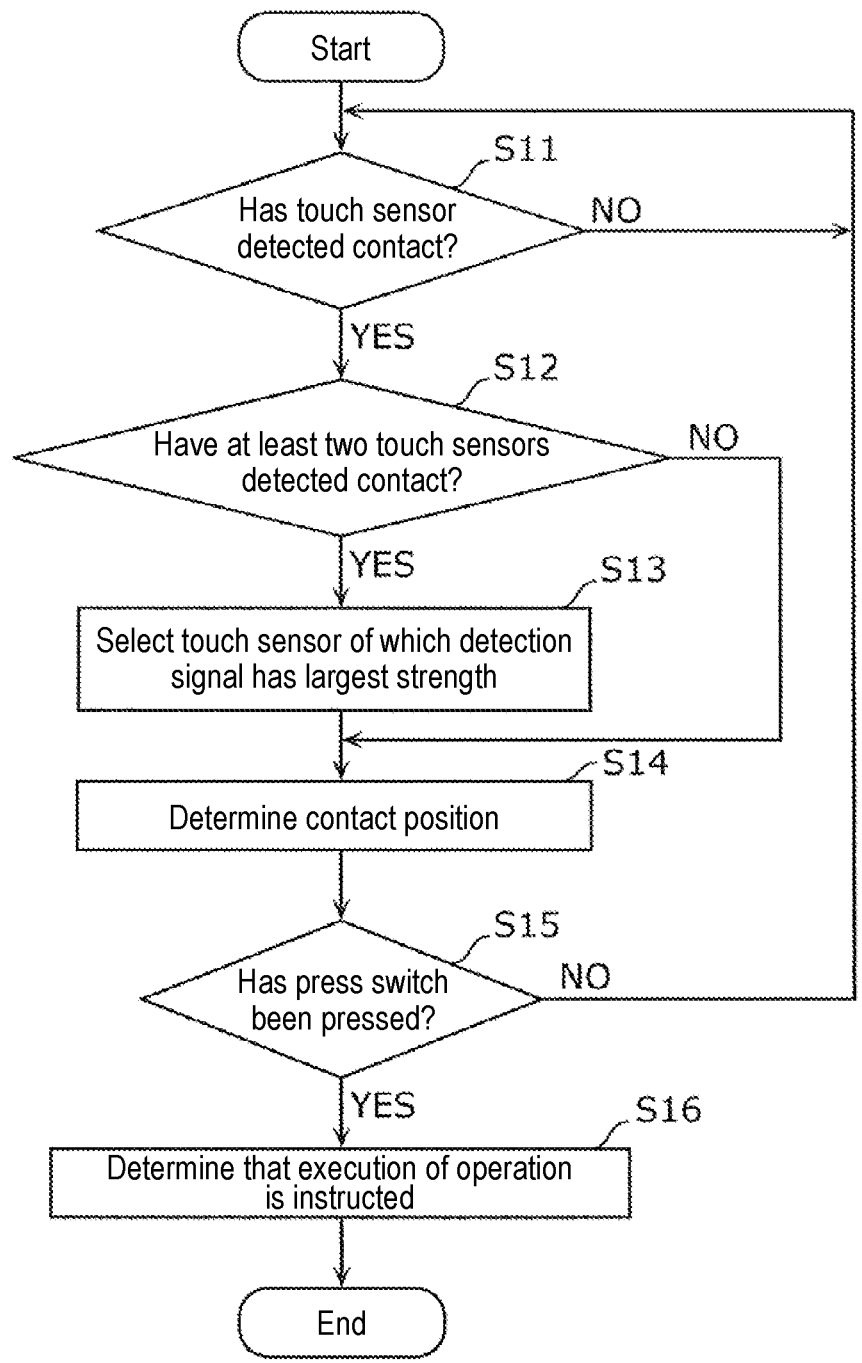
FIG. 11 is a flowchart illustrating a flow of an operation of an input device according to the second exemplary embodiment.

Next, an operation of input device 10A according to the second exemplary embodiment will be described with reference to FIG. 11. FIG. 11 is a flowchart illustrating the flow of the operation of input device 10A according to the second exemplary embodiment.

The second exemplary embodiment describes a case in which the driver performs inputting on first operation member 26 of input device 10A. As illustrated in FIG. 11, when finger 18 of right hand only contacts first contact part 54, only first touch sensor 32 detects the contact of finger 18 of right hand (YES in S11 and NO in S12). In this case, steps S14 to S16 are executed similarly to steps S2 to S4 in FIG. 9 described in the first exemplary embodiment.

On the other hand, when finger 18 of right hand simultaneously contacts first contact part 54 and operation region 60d of second contact part 58, first touch sensor 32 and second touch sensor 34d both detect the contact of finger 18 of right hand (YES in S11 and YES in S12). In this case, controller 62A compares the strengths of detection signals from first touch sensor 32 and second touch sensor 34d with the threshold so as to select first touch sensor 32 of which the detection signal has a strength larger than the threshold (S13). Accordingly, controller 62A determines that a contact position of finger 18 of right hand is at first contact part 54 (S14). Thereafter, steps S15 and S16 are executed similarly to steps S3 and S4 in FIG. 9 described in the first exemplary embodiment.

2-3. Effects

In input device 10A according to the second exemplary embodiment, when finger 18 of right hand simultaneously contacts first contact part 54 and second contact part 58, controller 62A can accurately determine which of the first operation and the second operation is instructed to be executed by comparing the strengths of detection signals from first touch sensor 32 and any of second touch sensors 34a to 34d with the threshold.

2-4. Modification of Second Exemplary Embodiment

The second exemplary embodiment describes the case in which finger 18 of right hand simultaneously contacts first contact part 54 and second contact part 58. However, for example, finger 18 of right hand may not contact first contact part 54 but may simultaneously contact at least two of operation regions 60a to 60d of second contact part 58. In such a case, controller 62A compares the strengths of detection signals from at least two of second touch sensors 34a to 34d with the threshold. Accordingly, it is possible to accurately determine which of the second operations associated with operation regions 60a to 60d is instructed to be executed.

MODIFICATION

The above describes an input device and a steering input device according to one or a plurality of aspects with reference to the embodiments, but the present disclosure is not limited to these embodiments. The scope of the one or plurality of aspects may include, without departing from the gist of the present disclosure, a configuration achieved by applying various modifications conceived by the person skilled in the art to the present embodiments or a configuration achieved by combining components in different exemplary embodiments and modifications.

Although the above embodiments describe the case in which in-vehicle instrument 6 operated by input device 10 (10A) is an audio instrument, the present disclosure is not limited thereto. In-vehicle instrument 6 may be, for example, an air conditioner or a car navigation system.

Although the above embodiments describe the case in which second operation member 28 is tilted in four directions of up, down, right, and left directions, the present disclosure is not limited thereto. Second operation member 28 may be tilted in, for example, two directions or eight directions.

Although first touch sensor 32 and the plurality of second touch sensors 34a to 34d are capacitance touch sensors in the above embodiments, the present disclosure is not limited thereto. First touch sensor 32 and the plurality of second touch sensors 34a to 34d may be, for example, resistance touch sensors.

Although the above embodiments describe the case in which input device 10 (10A) is mounted on steering input device 2, the present disclosure is not limited thereto. Input device 10 (10A) may be mounted on, for example, an electronic device such as an audio instrument or a remote controller.

Although the above embodiments describe the case in which press switch 48 is pressed, finger 18 of right hand may perform a gesture operation on surfaces of first contact part 54 and second contact part 58 instead of pressing press switch 48. In this case, first touch sensor 32 and the plurality of second touch sensors 34a to 34d detect the motion of finger 18 of right hand on the surfaces of first contact part 54 and second contact part 58.

Each component in the embodiments may be a dedicated hardware or may be achieved by executing a software program appropriate for the component. The component may be achieved by a program executor such as a CPU or a processor reading out a software program recorded in a hard disk or a recording medium such as a semiconductor memory and executing the software program.

The present disclosure also includes the following configurations.

(1) Each device described above may be achieved by a computer system including, specifically, a micro processor, a ROM, a RAM, a hard disk unit, a display unit, a keyboard, and a mouse. The RAM or the hard disk unit stores therein a computer program. The functionality of the device is achieved by the micro processor operating according to the computer program. The computer program is a set of a plurality of command codes combined so as to achieve predetermined functions, the command codes each representing a command to a computer.

(2) Some or all of components included in each device described above may be included in one system large scale integration (LSI). The system LSI is a super multifunctional LSI manufactured as an integration of a plurality of component parts on one chip, and is a computer system including, specifically, a micro processor, a ROM, and a RAM. The ROM stores therein a computer program. The functionality of the system LSI is achieved by the micro processor loading the computer program from the ROM onto the RAM and performing an operation such as a calculation according to the loaded computer program.

(3) Some or all of components included in each device described above may be included in an IC card or a single module detachably attached to the device. The IC card or the module is a computer system including, for example, a micro processor, a ROM, and a RAM. The IC card or the module may include the above-described super multifunctional LSI. The functionality of the IC card or the module is achieved by the micro processor operating according to a computer program. The IC card or the module may have an anti-tamper property.

(4) The present disclosure may be achieved by the methods described above. These methods may be achieved by a computer program achieved by a computer, or may be achieved by a digital signal as the computer program.

The present disclosure may be achieved by a computer-readable recording medium such as a flexible disk, a hard disk, a CD-ROM, a MO, a DVD, a DVD-ROM, a DVD-RAM, a Blu-ray (registered trademark) disc (BD), or a semiconductor memory that records therein a computer program or a digital signal. Alternatively, the present disclosure may be achieved by the digital signal recorded in the recording medium.

The present disclosure may be achieved by transmitting a computer program or a digital signal through, for example, an electrical communication line, a wireless or wired communication line, a network such as the Internet, or data broadcasting.

The present disclosure may be a computer system including a micro processor and a memory, in which the memory stores therein a computer program, and the micro processor operates according to the computer program.

The present disclosure may be achieved by another independent computer system by recording a program or a digital signal in a recording medium and transferring the recording medium to the computer system or by transferring a program or a digital signal through, for example, a network, to the computer system.

(5) The embodiments and modifications described above may be optionally combined.

An input device according to the present disclosure can be mounted on, for example, a steering wheel of a vehicle.

What is claimed is:

1. An input device comprising:
a press switch configured to be pressed in a direction of a predetermined axis;
a first operation member configured to be moved in the predetermined axis to press the press switch;
a second operation member disposed circularly around the first operation member and configured to be tilted relative to the predetermined axis to press the press switch;
a first touch sensor disposed on the first operation member and configured to detect contact of an operating object with the first operation member; and
a second touch sensor disposed on the second operation member and configured to detect contact of the operating object with the second operation member.

2. The input device according to claim 1, further comprising a controller configured to determine that execution of a predetermined operation is instructed by a user when the press switch is pressed,
wherein when the press switch is pressed and the first touch sensor detects contact of the operating object, the controller determines that execution of a first operation associated with the first operation member is instructed, and when the press switch is pressed and the second touch sensor detects contact of the operating object, the controller determines that execution of a second operation associated with the second operation member is instructed.

3. The input device according to claim 2, wherein when the press switch is pressed and the first touch sensor and the second touch sensor both detect contact of the operating object, the controller determines that execution of one of the first operation and the second operation is instructed, based on a comparison of strengths of detection signals from the first touch sensor and the second touch sensor with a threshold.

4. The input device according to claim 2, wherein the second operation member is tiltable relative to the predetermined axis in a plurality of directions and includes a plurality of operation regions disposed for the respective directions, the second touch sensor detects contact of the operating object with any of the operation regions, and when the press switch is pressed and the second touch sensor detects the contact of the operating object, the controller determines that execution of the second operation associated with any of the operation regions is instructed.

5. The input device according to claim 1, wherein
the first operation member includes:
a first pressing part configured to press the press switch; and
a first contact part which is disposed on the first pressing part at an end opposite to the press switch, and which the operating object contacts, and
the first touch sensor is disposed between the first pressing part and the first contact part.

6. The input device according to claim 1, wherein
the second operation member includes:
a second pressing part configured to press the press switch; and
a second contact part disposed on the second pressing part at an end opposite to the press switch, and which the operating object contacts, and
the second touch sensor is disposed between the second pressing part and the second contact part.

7. A steering input device comprising:
a steering wheel; and
the input device according to of claim 1 disposed on the steering wheel.

* * * * *